United States Patent [19]

Garlapaty

[11] Patent Number: 4,513,997
[45] Date of Patent: Apr. 30, 1985

[54] FITTING FOR AN INFLATABLE TUBE

[75] Inventor: Venkat R. Garlapaty, Utica, Mich.

[73] Assignee: Greenco Corporation, Dearborn, Mich.

[21] Appl. No.: 431,846

[22] Filed: Sep. 30, 1982

[51] Int. Cl.³ ............................................. F16L 33/00
[52] U.S. Cl. .................................... 285/242; 285/253
[58] Field of Search ........................ 285/242, 252, 253

[56] References Cited

U.S. PATENT DOCUMENTS

| 2,157,652 | 5/1939 | Merriman | 123/103 |
|---|---|---|---|
| 2,973,024 | 2/1961 | Merriman | 153/1 |
| 2,976,888 | 3/1961 | Merriman | 137/784 |
| 3,016,884 | 1/1962 | Merriman | 121/48 |
| 3,084,961 | 4/1963 | Merriman | 285/242 |
| 3,121,577 | 2/1964 | Merriman | 285/150 |
| 3,204,284 | 9/1965 | Merriman | 16/2 |
| 3,219,336 | 11/1965 | Merriman | 269/187 |
| 3,276,798 | 10/1966 | Merriman | 287/21 |
| 3,343,734 | 9/1967 | Merriman | 223/96 |
| 3,345,885 | 10/1967 | Merriman | 4/85 |
| 3,501,792 | 3/1970 | Merriman | 12/115.6 |
| 3,618,557 | 11/1971 | Merriman | 116/96 |
| 3,848,516 | 11/1974 | Merriman | 92/92 |
| 3,870,058 | 3/1975 | Merriman | 132/73 |
| 3,918,156 | 11/1975 | Merriman | 30/151 |
| 3,952,688 | 4/1976 | Merriman | 116/28 |
| 4,050,402 | 9/1977 | Merriman | 116/96 |
| 4,178,015 | 12/1979 | Merriman et al. | 280/711 |

Primary Examiner—Richard J. Scanlan, Jr.
Attorney, Agent, or Firm—Gifford, VanOphem, Sheridan, Sprinkle & Nabozny

[57] ABSTRACT

An end fitting for an inflatable tube motor comprising plates each having a convex portion intermediate flat end portions, a resilient bushing having an elongated body with an enlarged central portion intermediate two substantially flat portions and a tubular fluid coupling having an elongated stem inserted in a throughbore in the enlarged portion of the bushing. The elongated body of the bushing is inserted into the end of an inflatable tube while one end of the tube abuts against a raised rib on one end of the bushing. A connector portion of the fluid coupling extends outwardly from the ribbed end of the bushing with the body portion of the bushing inserted in the end of the tube. The plates are placed over opposite sides of the tube end and pressed together to form a sealing engagement between the bushing and the tube end as well as the bushing and the fluid coupling, thereby permitting fluid communication with the interior of the tube only through the fluid coupling.

9 Claims, 7 Drawing Figures

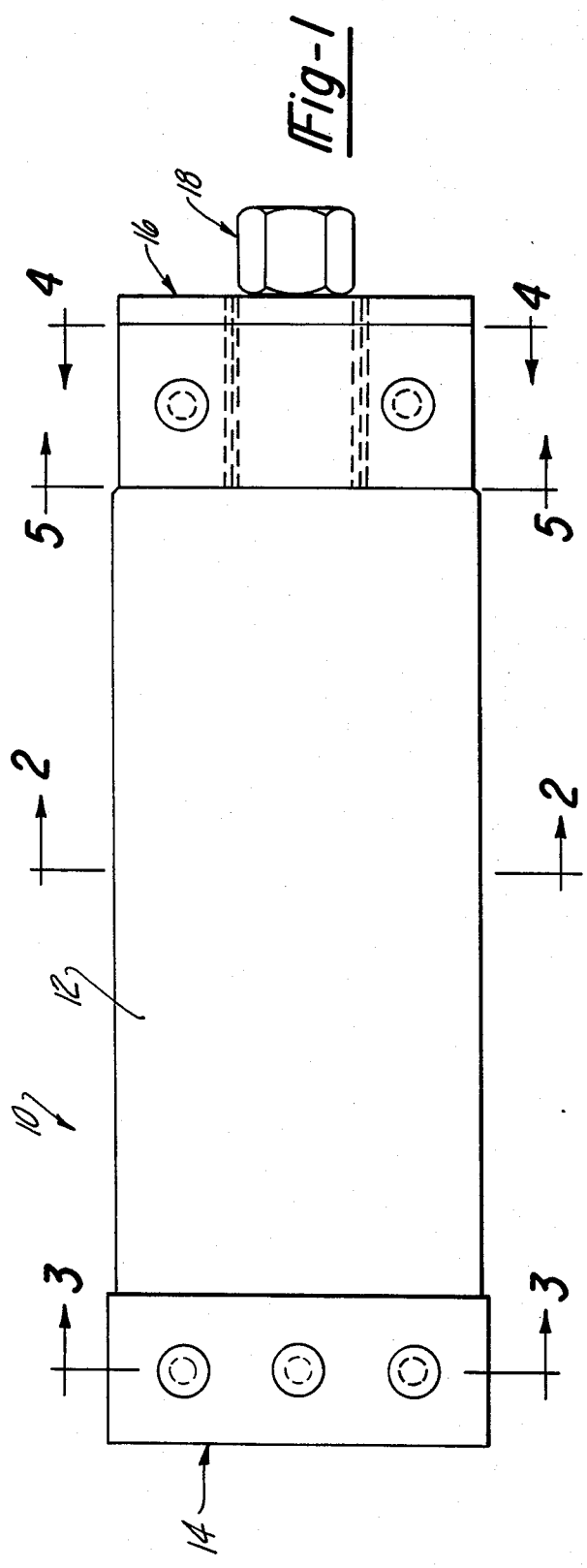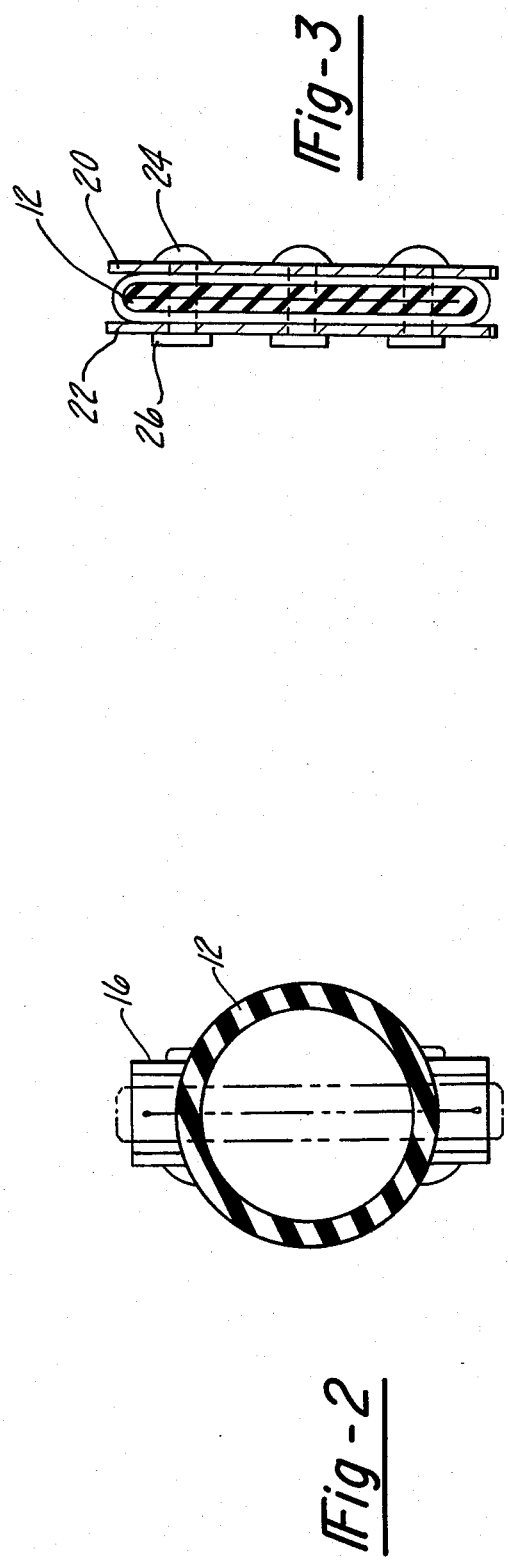

FITTING FOR AN INFLATABLE TUBE

BACKGROUND OF THE INVENTION

I. Field of the Present Invention

The present invention relates generally to fluid activated expansion devices, and more particularly, to an expansion motor having a fitting enclosing one end of an inflatable tube and a fitting with a fluid coupling at the other end of the tube.

II. Description of the Prior Art

Inflatable hose type power units are previously known and generally comprise fittings at the ends of the hose for sealing the ends. It is also known that at least one of the hose end fittings can be specially constructed to include ports so that a pressurized fluid can be introduced into and exhausted from the hose interior.

Some previously known power units of this type are disclosed in U.S. Pat. No. 3,016,884, U.S. Pat. No. 2,976,888, U.S. Pat. No. 3,084,961 and U.S. Pat. No. 3,121,577 wherein various hose fittings are also disclosed. In the previously known fittings, it has been considered important to provide a flat nipple insertable into one end of the hose and then clamping the hose to the nipple so that the end of the hose is maintained in a substantially flat position. For this reason, the fittings included nipples formed as near as possible to a flat configuration so that the end of the hose remains substantially flat when fluid is exhausted from the hose. Nevertheless, the narrow configuration often necessitated the use of narrow elongated ports for the fluid introduction into and exhaustion from the hose interior. Such slots are restrictive to the flow of fluid and affect the inflating and deflating action of the power unit. In particular, inflation or deflation of the tube may be delayed much longer than desired in particular applications.

Another disadvantage of the previously known inflatable tube motors is that the end fittings are specially constructed to include the nipple as well as fluid couplings which permit the fitting to be connected to a fluid source. Such complex structures are difficult to design and costly to produce. Alternatively, the fluid couplings are often specially designed to fit and become clamped between the pressure plates of a fitting so that the conduit can be fixedly secured and positioned at the end of the inflatable tube motor.

SUMMARY OF THE PRESENT INVENTION

The present invention overcomes the above mentioned disadvantages by providing a fitting for a fluid expansion motor unit which enables a standard cylindrical coupling to be employed while enabling the tube, body or hose to retain a substantially flat shape at the end by the fitting when the hose is deflated. Thus, the present invention provides a simple and inexpensive fitting with a fluid port which does not restrict the flow of fluid into and out of the interior of the tube and which completely seals the end of the tube to provide fluid communication to the tube only through the fluid coupling.

The fitting generally comprises upper and lower pressure plates disposed on opposite sides of a pliable but resilient bushing, a fluid coupling entrained in a throughbore in the bushing, and means for compressibly urging the upper and lower plates together. The bushing comprises a body having an enlarged central portion disposed intermediate two substantially flattened end portions. The enlarged central portion includes a throughbore adapted to receive the body of a fluid coupling therein. Each of the pressure plates includes a convex central portion adapted to register with the enlarged central portion of the bushing.

The end of the fluid coupling inserted into the bushing preferably includes a reduced diameter end portion to minimize the height of the tube at the end when the tube is deflated.

The body portion of the bushing is inserted into the end of the inflatable tube and preferably includes a raised rib at the outer end of the bushing to form an abutment surface for the end of the inflatable tube as well as a means for grasping and positioning the bushing in the end of the tube. Once the bushing including the fluid coupling has been inserted into the end of the tube, plates are placed over opposite sides of the end of the tube and urged together by the tightening means to form a fluid tight connection about the end of the tube which permits fluid communication only through the fluid coupling in the bushing.

Thus, the present invention provides a simple and lightweight fitting for inflatable tube motors and enables the inflatable tube to maintain a substantially flattened shape when the tube is deflated. In addition, the fluid coupling permits unrestricted inflation and deflation of the tube. The fluid coupling utilized can therefore be a standard fluidized coupling without requiring modification of the body, the coupling or other components of the fitting. Thus, the device is substantially simpler than previously known fittings for inflatable tube motors, and substantially less costly to fabricate. In addition, it is easy to install and does not require special tools for installation.

BRIEF DESCRIPTION OF THE DRAWINGS

The present invention will be more clearly understood by reference to the following detailed description of the preferred embodiment, when read in conjunction with the accompanying drawing in which:

FIG. 1 is a top plan view of an inflatable tube motor having a fitting in accordance with the present invention;

FIG. 2 is a sectional view taken substantially along the line 2—2 in FIG. 1;

FIG. 3 is a sectional view taken substantially along the line 3—3 in FIG. 1;

DETAILED DESCRIPTION OF A PREFERRED EMBODIMENT OF THE PRESENT INVENTION

Figure 4:
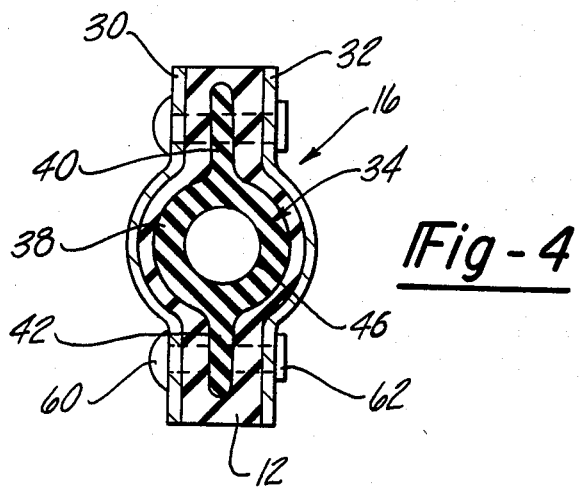
FIG. 4 is a sectional view taken substantially along the line 4—4 in FIG. 1.

Referring first to FIG. 1, an inflatable tube motor 10 is thereshown comprising an inflatable tube 12 having a first end fitting 14 and a second end fitting 16. The fitting 16 includes a fluid coupling 18 in fluid communication with the interior of the tube 12 so that fluid can be introduced and exhausted from the tube 12. As best shown in FIG. 2, the tube 12 is substantially cylindrical when inflated while it remains in its substantially flattened shape as shown in phantom line in FIG. 2 when deflated.

Referring now to FIG. 3, the fitting 14 is thereshown comprising a first plate 20 and a second plate 22 which are substantially flat rectangular plates. After coating the inside walls of an end of the tube with an adhesive, the tube 12 is sandwiched between the plates 20 and 22 to fluidly seal the end completely. Registering apertures are bored through the plates 20 and 22 and the end of the tube 12 so that fasteners such as the bolts 24 can be inserted therethrough and tightened by the nut 26. Thus, the flexible material of the tube 12 is pressed against and sealed to itself to close the end of the tube 12.

Figure 6:
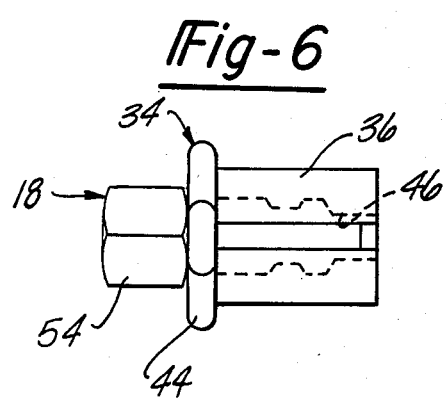
FIG. 6 is a side plan view of a portion of the fitting shown in FIGS. 1, 4 and 6.
Figure 5:
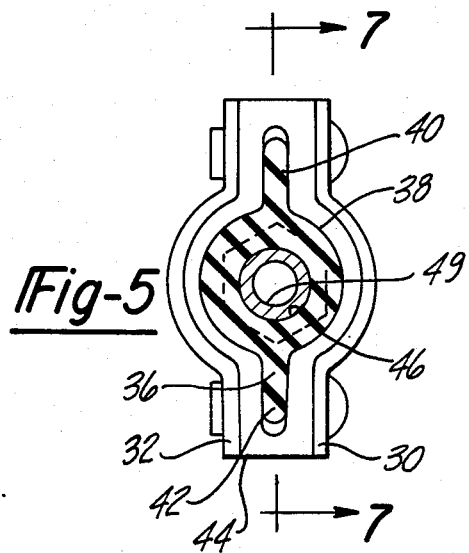
FIG. 5 is a sectional view taken substantially along the line 5—5 in FIG. 1.
Figure 7:
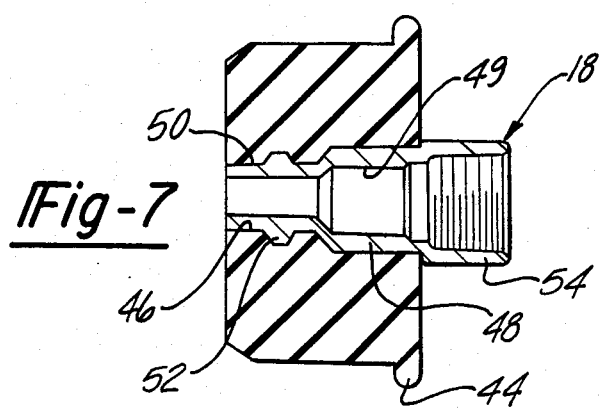
FIG. 7 is a sectional view taken substantially along the line 7—7 in FIG. 5.

Referring now to FIG. 4, the fitting 16 is thereshown as comprising a first plate 30, a second plate 32 and a pliable but resilient bushing 34 disposed between the plates 30 and 32. As best shown in FIGS. 5 through 7, the bushing 34 is preferably constructed of neoprene, rubber or similar material and includes an elongated body portion 36 having an enlarged central portion 38 intermediate two substantially flat side portions 40 and 42. One end of the elongated body 36 includes an enlarged rib 44. The enlarged central portion 38 is substantially cylindrical and includes an axial throughbore 46 therein. The plates 30 and 32 include arcuate central portions located intermediate flat side portions and, therefore, generally conform to the shape of the top and bottom surfaces of the bushing 34.

Fluid coupling 18 includes an elongated body portion 48 which is received in the throughbore 46 in the bushing 34, and a connector sleeve portion 54. The elongated substantially cylindrical portion 48 includes a reduced diameter portion 50 at the end inserted into the bushing 34. The elongated portion 48 also includes an expanded rib 52 which tightly engages the peripheral walls of the throughbore 46 so as to lock the coupling 18 within the bushing 34. The female threaded sleeve portion 54 extends outwardly from the bushing 34 to provide means for connecting the coupling 18 to a correspondingly threaded fluid conduit means (not shown) for supplying fluid to inflate and deflate the tube 12. It will be understood that while the configuration of the coupling 18 includes particular structural features, it represents one of many conventional, standard sized fluid couplings which could also be employed within the scope of the present invention. Thus, the present invention permits the use of readily available parts for use in an inflatable tube motor without extensive modification of the fitting parts or the coupling.

Referring again to FIG. 4, it can be seen that appropriate fasteners such as the bolts 60 extend through registering apertures in the plates 30 and 32 as well as the tube 12 and the flatened side portions 40 and 42 of the bushing 34. The enlarged head of the bolt 60 and nuts 62 tightened on the bolts 60 compress the plates 30 and 32 so that the end of the tube 12 is sandwiched between the periphery of the bushing 34 and the plates 30 and 32. Accordingly, the end of the tube is closed although the interior of the tube remains in fluid communication exteriorly of the tube by means of the fluid coupling 18.

Having thus described the important structural features of the present invention, the assembly and operation of the device is easily described. A cylindrical fluid coupling 18 is inserted into the throughbore 46 of bushing 34 so that the end of the reduced diameter portion 50 is substantially flush with the end of the bushing 34. In this manner, compression of the bushing 34 does not obstruct the fluid passage 49 in coupling 18 when the bushing is deformed by compression. While the bore 46 can be made of the single diameter so that the enlarged portions of the elongated coupling portions 48 are tightly wedged within the bushing 34, it will also be understood that the bore 46 can be provided with appropriate enlarged diameter recesses corresponding to the enlarged portions of the elongated coupling portion 48. In any event, the elongated portion 48 of coupling 18 remains tightly entrained within the bushing 34 while the sleeve portion 54 remains exposed exteriorly of the bushing 34 so that it is readily accessible for connection with appropriate fluid conduit means. In the preferred embodiment, it will be appreciated that the connecting portion 54 extends axially outwardly from the bushing 34 so that the periphery can be engaged by a wrench, although it is also within the scope of the present invention to use other fluid couplings such as a shorter coupling which is merely exposed from and flush with the ribbed end of the bushing 34.

The inside walls of the tube 12 and outside surfaces of the bushing 34 and body portion 36 are coated with an adhesive, and the body portion 36 of the bushing 34 is then inserted into an open end of the inflatable tube 12 until the end of the tube 12 abuts against the rib 44. The plates 30 and 32 are then placed over opposite sides of the tube whereby the flat side portions of the plates 30 and 32 are in registry over the flat side portions 40 and 42 of the bushing 34 with the convex portions of the plates 30 and 32 engaging brackets corresponding to the enlarged portion 38 of the resilient bushing 34. The bolts 60 are then inserted through appropriate apertures in the flat portions of the plates, the tube 12 and the flat portions of the bushing 34. The plates, 30 and 32 are then pressed together by tightening of the nuts 62 on the bolts 60. While tightening of the bolts 60 causes displacement of the plates in a single direction, the arcuate portions of the plates and the correspondingly shaped enlarged portion of the bushing 34 cause the bushing to tightly engage the periphery of the elongated portion 48 of the fluid coupling 18 so that a fluid tight seal is formed around the coupling as well as at the end of the tube 12. Thus, the interior of the tube 12 fluidly communicates only with the interior bore 49 of the fluid coupling 18 and, thereby fluidly communicates exteriorly of the motor 10 for connection to a fluid source. Of course, the other end of the tube 12 is sealed by the fitting 14 as previously discussed. Accordingly, the flat conduit means secured to the connector portion 54 of coupling 18 can control the inflation and deflation of the tube 12 and thereby operate the motor 10.

Having thus described my invention, many modifications thereto will become apparent to those skilled in the art to which it pertains without departing from the scope and spirit of the present invention as defined in the appended claims.

What is claimed is:

1. An expansion device comprising:
   a resilient inflatable tube having open ends,
   a first plate and a second plate, each plate having a convex central portion intermediate two flat portions,
   a resilient bushing having a substantially cylindrical body and two flat end portions which extend radially outwardly from opposite sides of said body, said end portions being substantially coplanar, said body having an axial throughbore and said bushing being insertable into one end of said tube, a fluid coupling having an elongated stem and a fluid connector on one end of the stem, said stem being insertable through said body throughbore so that said fluid connector is positioned axially adjacent said body, said plates being positioned on opposite sides of said one end of said tube so that said tube and said bushing are sandwiched between said plates, said body being positioned between said convex central portions of said plates, means for compressably securing said plates together, said securing means comprising at least two threaded fasteners, one fastener extending through said plates and one flat end portion and the other fastener extending through said plates and the other flat end portion wherein upon tightening of said fasteners, said tube compresses against said bushing and said bushing compresses against said fluid coupling, and means for closing the other end of said tube.

2. The invention as defined in claim 1 wherein said bushing includes an enlarged rib on one axial end which abuts against said one end of said tube.

3. The invention as defined in claim 1 wherein said fluid coupling is a standard sized conventional cylindrical fluid coupling.

4. The invention as defined in claim 1 wherein said bushing is made of neoprene.

5. The invention as defined in claim 1 where in each said fastener is a bolt with an enlarged head and elongated threaded portion, and further comprising a nut which threadably engages each bolt.

6. The invention as defined in claim 1 wherein said coupling includes means for lockingly engaging the throughbore in said bushing against axial movement.

7. The inventon as defined in claim 6 wherein said engaging means comprises an enlarged rib extending radially from said stem of said coupling.

8. The invention as defined in claim 1 wherein said connector comprises a threaded member extending outwardly from said bushing.

9. The invention as defined in claim 1 wherein said bushing is made of rubber.

* * * * *

UNITED STATES PATENT AND TRADEMARK OFFICE
CERTIFICATE OF CORRECTION

PATENT NO. : 4,513,997
DATED : April 30, 1985
INVENTOR(S) : Venkat R. Garlapaty

It is certified that error appears in the above-identified patent and that said Letters Patent is hereby corrected as shown below:

Column 4, line 32 delete "brackets corresponding to".

Claim 1, line 62, column 4 after "having" insert --a first--, delete "ends," and insert --end and a second open end--.

Column 4, lines 64-65 after "flat" insert --end--.

Column 5, line 2, after "into" insert --said--.

Column 5, line 2 delete "one" and insert --first open--.

Column 5, line 6 delete "body" and insert --axial--.

Column 5, line 9 delete "one" and insert --first open--.

UNITED STATES PATENT AND TRADEMARK OFFICE
CERTIFICATE OF CORRECTION

PATENT NO. : 4,513,997

DATED : April 30, 1985

INVENTOR(S) : Venkat R. Garlapaty

It is certified that error appears in the above-identified patent and that said Letters Patent is hereby corrected as shown below:

Column 5, line 17, after "flat end portion" insert --of said resilient bushing--.

Column 5, line 19, after "flat end portion" insert --of said resilient bushing--.

Claim 2, lines 2-3, column 6 delete "includes an enlarged rib on one axial end which abuts against said one end of said tube" insert --comprises an axial end, said axial end havin an enlarged rib, said enlarged rib abutting against said first open end of said tube--.

UNITED STATES PATENT AND TRADEMARK OFFICE
CERTIFICATE OF CORRECTION

PATENT NO. : 4,513,997

DATED : April 30, 1985

INVENTOR(S) : Venkat Garlapaty

It is certified that error appears in the above-identified patent and that said Letters Patent is hereby corrected as shown below:

Claim 6, lines 13-14, column 6 after "said" insert --fluid--.

Claim 7, line 16, column 6 delete "inventon" insert --invention--.

Signed and Sealed this

Eighth Day of October 1985

[SEAL]

Attest:

Attesting Officer

DONALD J. QUIGG

Commissioner of Patents and Trademarks—Designate